3,042,354
RECEPTACLE BRACKET
Charles M. Goodwin, Rte. 2, Mount Vernon, Ohio
Filed Apr. 22, 1960, Ser. No. 24,176
5 Claims. (Cl. 248—205)

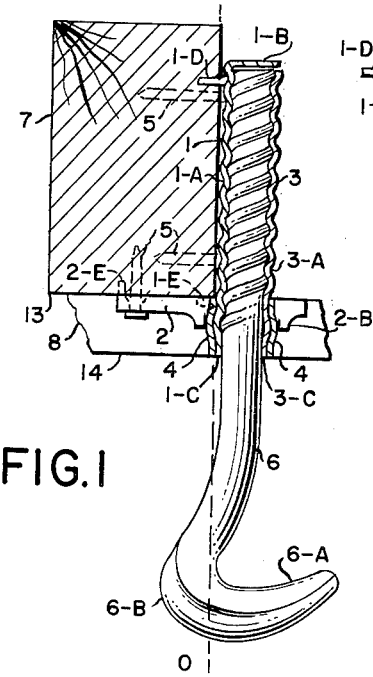
July 3, 1962
C. M. GOODWIN
3,042,354
RECEPTACLE BRACKET
Filed April 22, 1960
INVENTOR
CHARLES M. GOODWIN
BY *Joseph B. Lindecker*
ATTORNEY

This invention relates to load supporting devices, and more particularly to a load supporting hook detachably mounted by novel means to a load supporting structure.

Accordingly, it is a primary object of this invention to provide a load supporting device which is detachably connected by threaded means to a novel bracket assembly adapted to be secured to a supporting structure.

It is another object of the invention to provide a novel supporting device which is particularly adapted for supporting clotheslines, bar racks, swings, lamps, pictures, mirrors, and many other miscellaneous articles.

It is still another object of the invention to provide a novel supporting device which may be mounted in a variety of positions and on a variety of supporting surfaces such as rafters, ceilings, walls, etc.

It is another object of the invention to provide a supporting device which may be mounted on supporting surfaces or may be mounted in recesses within supporting structures whereby the bracket assembly for the supporting member is mounted completely within and its outer end is flush with the outer surface of the supporting structure.

It is still another object of the invention to provide a supporting device comprising a bracket assembly and a hook threaded therein wherein the bracket assembly is mounted within a supporting structure and when the hook is removed therefrom, a closure member may be inserted within the end of the bracket assembly to prevent entry of dirt or foreign objects and to improve the appearance thereof.

Still another object of the invention is to provide a load supporting device which is of relatively simple construction, light in weight, extremely strong, durable in use and economical to manufacture.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a vertical cross-section view showing this invention mounted on a vertical surface of a horizontally extending beam or rafter;

FIGURE 2 is an elevational side view of a tie plate comprising a detail of the invention;

FIGURE 3 is a side elevational view of the upper portion of the bracket assembly;

FIGURE 4 is a front elevational view of the structure shown in FIGURE 1 with the hook removed therefrom;

FIGURE 5 is a front elevational view of the tie plate shown in FIGURE 2, but showing the tie plate in an inverted position;

FIGURE 6 is a front elevational view of a closure cap for the bracket assembly;

FIGURE 7 is a plan view of the cap shown in FIGURE 6;

FIGURE 8 is a plan view of the structure shown in FIGURES 1 and 4;

FIGURE 9 is a vertical cross-sectional view showing the invention mounted in a horizontal position in a masonry wall; and FIGURE 10 is a plan view of a modified form of the bracket assembly.

With continuing reference to the drawings wherein identical reference numerals in the various views indicate the same parts, it can be seen that as shown in FIGURES 1 through 8, this invention includes a hook 6 threadedly connected to a bracket assembly which is secured to a vertical side surface of a horizontally extending wooden beam 7. The hook 6 includes a vertical shank having spiral threads on its upper end and a generally U-shaped bend formed on its lower end. The U-shaped bend includes an arcuate inner surface 6–A which is semi-circular in cross-section and a bottom arcuate surface 6–B which is triangular in cross-section.

The bracket assembly includes a base plate 1 and a front plate 3 rigidly connected together at their lower ends by a tie plate 2 and a ring 4.

As shown in FIGURE 4, both the base plate 1 and front plate 3 are generally of the same size and shape, and are both generally rectangular. The upper and lower edges are parallel and extend horizontally while the side edges thereof have V-shaped recesses therein. Both the plates 1 and 3 have part cylindrical grooves formed in their central portions which extend vertically, and the concave portions of these grooves face one another so as to form a substantially cylindrical chamber which has internal threads formed therein for receiving and mating with the threaded end of the shank 6. As shown in FIGURE 8, the threaded arcuate recess in the plate 1 is relatively shallow while the threaded recess in front plate 3 is much deeper and projects forwardly from the bracket assembly a relatively great distance.

As shown in FIGURES 1, 4 and 8, the upper edge of the base plate 1 is bent forwardly at its center to form an arcuate cover or flap 1–B for covering and closing the upper end of the threaded cylindrical chamber in the bracket assembly. Each side of the cover 1–B is folded over the upper edges of the plate 3 180° so as to form a generally U-shaped flange 1–F as shown in FIGURE 3 for maintaining the plates securely together at their upper edges.

The four corners of the base plate 1 have generally rectangular flanges formed therefrom and bent rearwardly to form fastening cleats 1–D and 1–E. The cleats 1–D are shown as extending into the beam 7 while the cleats 1–E extend below the beam. The base plate 1 has rectangular tabs 1–G formed integrally with the side edges thereof. These tabs 1–G are bent and folded over the central portions of the side edges of the front plate 3 to securely maintain and hold these plates in assembled relationship.

The plates 1 and 3 at the bottom edges thereof have semi-circular extensions 1–C and 3–C formed integrally therewith so as to form a cylindrical extension of the cylindrical chamber for the shank of hook 6. These cylindrical extensions 1–C and 3–C are enclosed by an annular ring 4 and the central peripheral portions of the members 1–C and 3–C are expanded outwardly into an annular recess within the ring 4 so as to securely connect the ring to these extensions.

As shown in the drawings, the bracket assembly further includes a tie plate 2 which is of generally triangular configuration in plan so as to include a forward apex whose outer edges are rounded and which apex is provided with a vertical bore 2–A formed by punching the plate 2 so as to provide a circular lip projecting downwardly and surrounding the hole 2–A. The rear corners of the tie plate are provided with apertures 2–D which are chamfered at 2–C for receiving securing members such as screws or nails 5. Also, the rear corners of the tie plate have rectangular portions punched downwardly therefrom so as to form flexible cleats 2–E which may be deflected or bent in either direction. As shown in FIGURE 1, the ring 4 extends through the hole 2–A and has been expanded tightly into engagement therewith and into engagement with the circular lips 2–B. The cleats 2–E have been deflected or bent upwardly 180° so as to extend into the bottom surface of the beam 7. However, the cleats 2–E may be deflected either up or down as desired. Fastening members 5 which may comprise nails or screws have been inserted through apertures 2–D in the tie plate and into the beam 7. Also, it is to be noted that the base plate 1 and front plate 3 are also provided with a plurality of bores arranged in rows on each side of the threaded portion thereof. Nails or fastening members 5 also extend through these apertures for securing the plates 1 and 3 to the face of beam 7. Also, these fastening members 5 further assist in holding or securing the plates together. Spot welds 3–B may also be provided for securing the plates together.

It is thus readily apparent that the flanges 1–F, tabs 1–G, fastening members 5, ring 4 and tie plate 2 rigidly secure the plates 1 and 3 together and to the beam 7. Also, it is to be noted that the ring 4 and tie plate 2 encircles the extensions of plates 1 and 3 at the lower end thereof so as to provide the maximum amount of strength where the stress is greatest.

The hook 6 may be easily unscrewed from the supporting bracket assembly whenever desired, and for improving the appearance of the bracket assembly, a decorative cap 11 is provided for covering the lower end thereof. The cap 11 includes a circular cover member slightly convex on its bottom surface and having upwardly extending tabs 11–A arranged in a circle and each tab is slightly arcuate so that its central portion extends further radially outwardly than its upper end. Therefore, the upper ends of these tabs fit easily within the circular extensions 1–C and 3–C and the arcuate surfaces of these tabs cam them inwardly as the cap or cover 11 is pushed upwardly. The resilient compression of these tabs frictionally and securely hold the cap 11 in position. By covering the threaded opening in the bracket assembly by means of the cap 11, not only is the appearance of the bracket assembly improved, but also entry of dust and dirt into the threaded aperture is prevented. The arcuate surfaces of the tabs 11–A fit snugly within the arcuate recess 9 formed in the extensions 1–C and 3–C for further holding the cover 11 more firmly in position.

It is also to be noted that the cleats 2–E, 1–D, and 1–E extend into or lie adjacent the supporting beam 7 for more rigidly securing the bracket assembly in place.

FIGURE 9 illustrates how the bracket assembly could be installed within a horizontal bore in a vertical masonry wall 12. In such a construction, the assembled bracket assembly without the tie plate 2 is mounted centrally of the bore so that its outer end projects forwardly of the wall 12 a sufficient distance equal to the thickness of a plaster covering 8. The bore in the wall 12 must be of sufficient size to accommodate the entire width of the plates 1 and 3, and preferably the bore is of rectangular shape or wider than it is deep. After the bracket assembly is installed in the bore, the space between the bracket and the bore walls are filled or tamped with mortar or a sealing compound and a finished plaster coating 8 may be applied over the wall. It is to be noted that the surface of the plaster wall 14 terminates flush with the end of the bracket assembly. The hook 6 is then screwed into the bracket assembly in the conventional manner and projects forwardly from the wall in a horizontal position. When the hook is removed, the decorative or dust cap 11 may be installed in the threaded bore of the bracket in the manner explained above.

FIGURE 10 illustrates a plan view of a modified form of the bracket assembly. In this form, the bracket assembly 1 shown in FIGURE 10 is formed from one single piece of flat sheet metal so as to provide a centrally vertically extending cylindrical portion having a threaded bore 10 therein. The corners of the bracket 1 are deflected rearwardly to form tabs 1–D similar to the tabs 1–D shown in FIGURE 1.

The foregoing is considered as illustrative only of the principles of the invention. Further, since numerous modifications and changes will readily occur to those skilled in the art, it is not desired to limit the invention to the construction and operation shown and described, and accordingly, all suitable modifications and equivalents may be resorted to, falling within the scope of the invention as claimed.

What is claimed is:

1. A load supporting device adapted to be mounted on a supporting structure comprising a hook having a threaded shank, a bracket assembly including a front plate and a base plate rigidly secured together, the central portion of at least one of said plates being formed with an arcuate groove opposing a surface of the other plate, said groove and surface forming a generally cylindrical chamber, said chamber having threads therein mating with the threads on said shank, said plates being provided with opposing arcuate tabs extending beyond their adjacent edges, said tabs forming an extension of said cylindrical chamber, a ring extending around said extension and in frictional contact therewith, said threaded shank extending through said extension and into said chamber, the threads of the shank mating with the threads in the cylindrical chamber.

2. A device as defined in claim 1, wherein an edge of the base plate remote from said extension is folded over said front plate to form a securing flange.

3. A device as defined in claim 1, wherein one of said plates is provided with cleats extending therefrom and adapted to be connected to the supporting structure.

4. A device as defined in claim 1 wherein the inner surface of said extension is provided with an annular groove for receiving portions of a cap adapted to close the open end of the cylindrical chamber.

5. A load supporting device adapted to be mounted on a supporting structure comprising a hook having a threaded shank, a bracket assembly including a front plate and a base plate rigidly secured together, the central portion of at least one of said plates being formed with an arcuate groove opposing a surface of the other plate, said groove and surface forming a generally cylindrical chamber, said chamber having threads therein mating with the threads on said shank, said plates being provided with opposing arcuate tabs extending beyond their adjacent edges, said tabs forming an extension of said cylindrical chamber, a ring extending around said extension and in frictional contact therewith, said threaded shank extending through said extension and into said chamber, the threads of the shank mating with the threads in the cylindrical chamber, a tie plate having a bore therethrough and said bore extending generally perpendicular to said plates, said ring and cylindrical extension extending through said bore, said ring being in frictional engagement with the edges of said bore.

References Cited in the file of this patent

UNITED STATES PATENTS

| | | |
|---|---|---|
| 1,223,595 | McMillan | Apr. 24, 1917 |
| 2,294,139 | Strong | Aug. 25, 1942 |
| 2,950,823 | Woidka | Aug. 30, 1960 |